United States Patent [19]

King

[11] Patent Number: 4,972,508

[45] Date of Patent: Nov. 20, 1990

[54] HOUSING FOR A BATTERY POWERED DEVICE

[75] Inventor: Jeffrey S. King, Boynton Beach, Fla.

[73] Assignee: Motorola, Inc., Schaumburg, Ill.

[21] Appl. No.: 399,146

[22] Filed: Aug. 28, 1989

[51] Int. Cl.[5] .............................................. H04B 1/08
[52] U.S. Cl. ...................................... 455/90; 455/347
[58] Field of Search ................ 455/90, 347, 348, 349, 455/351; 340/825.44, 311.11; 220/4 R, 4 F, 345, 346, 347; 361/386, 392, 394, 395, 399

[56] References Cited

U.S. PATENT DOCUMENTS 3,763,434 10/1973 Blesch et al. ......................... 455/349
4,089,044 5/1978 Gatto et al. .......................... 455/348
4,194,157 3/1980 Uno ..................................... 455/348
4,631,640 12/1986 Umetsu et al. ....................... 361/422
4,807,759 2/1989 Castner ................................ 220/346

Primary Examiner—Reinhard J. Eisenzopf
Assistant Examiner—Lisa Charouel
Attorney, Agent, or Firm—William E. Koch; Vincent B. Ingrassia

[57] ABSTRACT

A housing for an electronic device powered by a battery, comprising a battery cover coupled to at least one of first and second interlocking portions for providing access to said battery and for securing said first and second interlocking portions.

7 Claims, 2 Drawing Sheets

HOUSING FOR A BATTERY POWERED DEVICE

FIELD OF THE INVENTION

This invention relates in general to the field of housings for a battery powered device, and more particularly to a housing having a battery cover that provides access to the battery and secures sections of the housing.

BACKGROUND OF THE INVENTION

Battery powered devices such as selective call receivers generally include a housing into which a battery is inserted (the housing having electrical contacts for coupling the battery to electrical circuits within the device). Such battery housings have an opening through which the battery is inserted and a battery housing cover (battery door) for covering the opening so that the battery is not accidently dislodged from the pager housing.

Conventional housings for electrical devices typically comprise at least two interlocking sections, and are assembled using various fasteners (e.g. screws) or fastening methods (e.g. sonic staking). Using screws or other fasteners to assemble the housing of an electronic device increases labor and material costs of the electronic device. Conversely, fastening methods such as sonic staking reduces the initial labor and material costs, but prevents the housing from being opened for repair once assembled. Because sonic staking deforms the housing, many products are considered non-repairable and discarded when the product needs repairs. Ultimately, with either fastening technique, the consumer pays additional costs for the device either initially, in repairs, or in replacing the product.

Another problem has been to provide a battery door that is self-locking and does not dislodge from the product. One known design that overcomes this problem is self-attaining and self-locking; however, this battery door was not designed to fasten the device's housing together. Therefore, fasteners are required to keep the device's housing intact.

Thus, a need exists for a housing having a secure battery door that contemporaneously interlocks sections of the housing.

SUMMARY OF THE INVENTION

Accordingly, it is an object of the present invention to provide an improved housing for a battery powered device.

In carrying out the above and other objects of the invention in one form, there is provided a housing for a battery powered electronic device comprising first and second interlocking portions, and a battery cover coupled to at least one of said first and second interlocking portions for providing access to said battery and for securing said first and second interlocking portions.

DETAILED DESCRIPTION OF THE INVENTION

Figure 1:
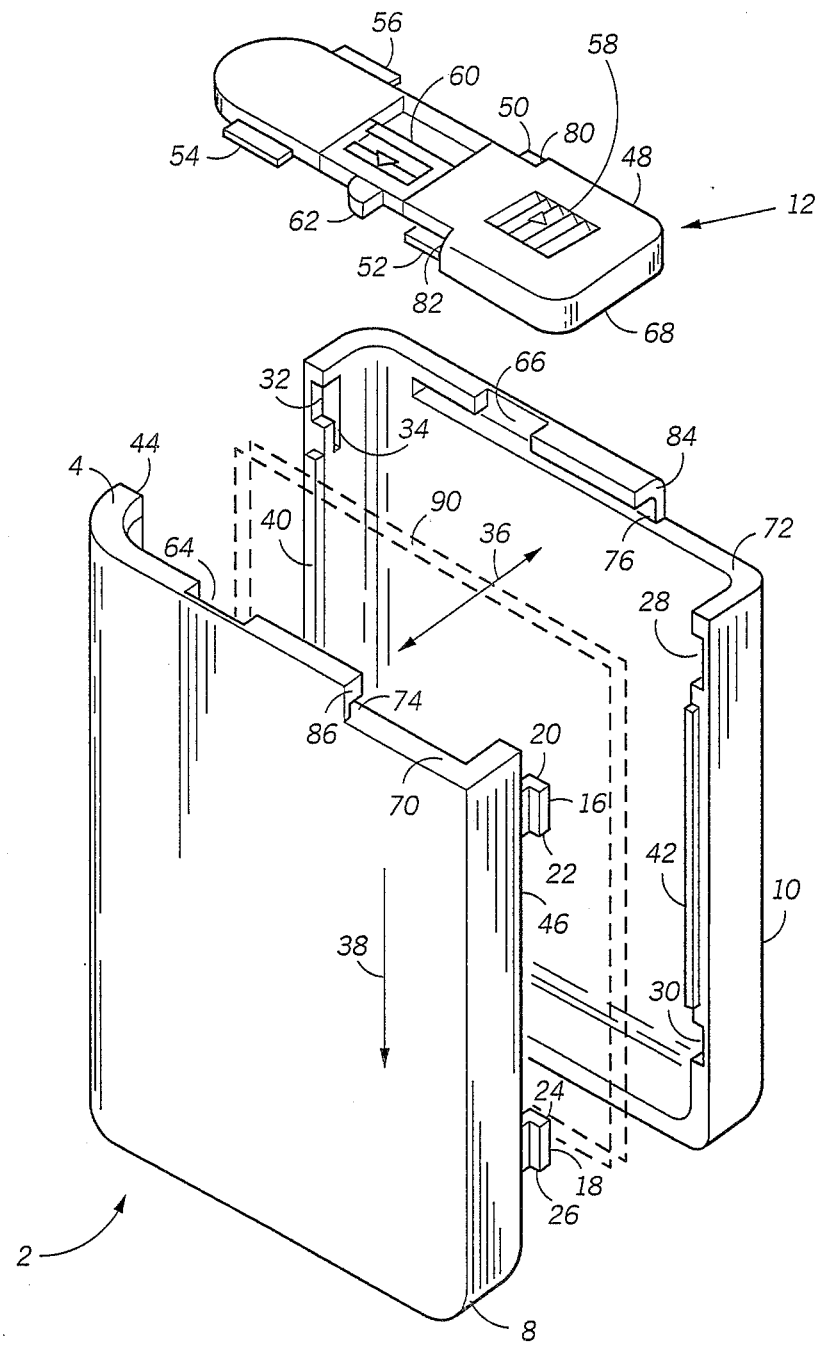
FIG. 1 is an exploded view of a housing in accordance with the present invention.
Figure 2:
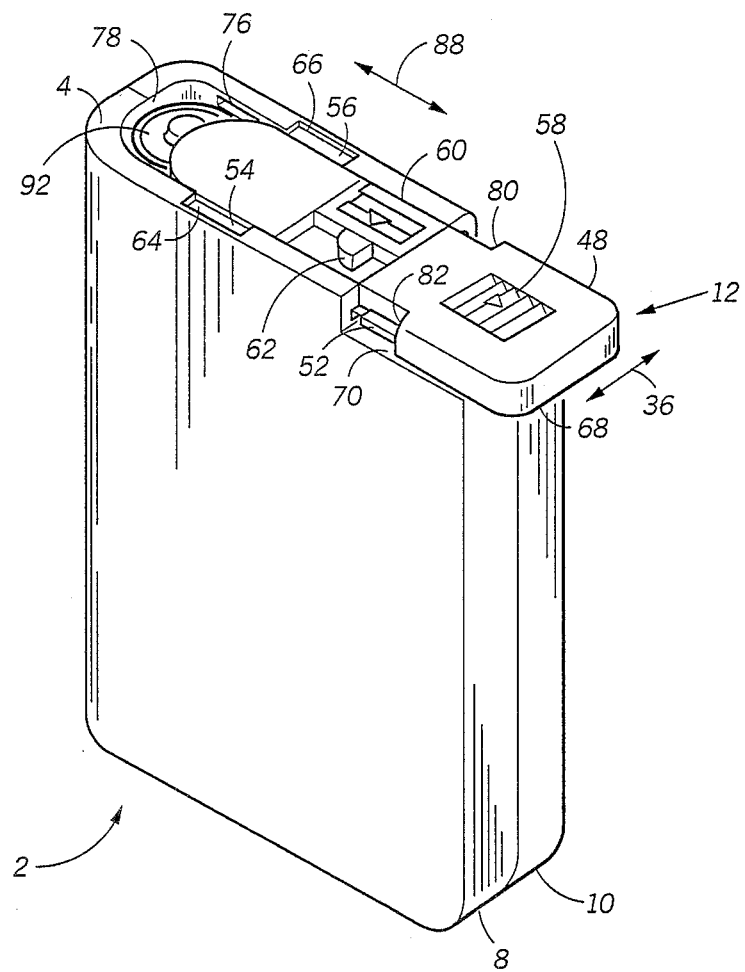
FIG. 2 is a perspective view of a housing in accordance with the present invention.

Referring to FIGS. 1 and 2, a housing 2 for a battery powered electronic device 90, such as a selective call receiver, preferably comprises two housing sections 8 and 10 (although any number of sections may be utilized). A surface 4 of the housing section 8 includes an opening 78 for insertion of a battery 92 into the battery powered electronic device 2 to provide electrical power. The housing section 8 also includes two members 16 and 18 and two additional members (not shown) symmetrically disposed on the opposed side of the section 8. The housing section 10 contains three openings 28, 30, and 32 and one additional opening (not shown) symmetrically disposed on the opposed side of the section 10 from the opening 30 so as to engage the members 16 and 18 on the section 8. The housing section 10 also includes a slot 34 and two additional slots (not shown) contiguous to openings 28 and 30 and one slot (not shown) located on the opposed side of the opening 30. The members 16 and 18, openings 28, 30, and 32, and slot 34 and those members, openings and slots not shown, may be formed in any number of configurations without deviating from the intent of the invention. The sections 8 and 10 may be assembled by moving sections 8 and 10 toward each other in a lateral direction 36 wherein the members 16 and 18 engage the openings 28 and 30, respectively. The section 8 may then be moved in a direction 38 so that the members 16 and 18 would slideably engage the slots contiguous to the openings 28 and 30, respectively. The tracks 40 and 42 of the section 10 align the surfaces 44 and 46 of the section 8, respectively, as the members 16 and 18 are engaged in the openings 28 and 30.

In the preferred embodiment, the battery door 12 comprises a body 48, tabs 50, 52, 54, and 56, a corrugated surface 58, and a locking mechanism 60. The battery door 12 is fastened to the housing sections 8 and 10 by placing the battery door surface 68 contiguous to the housing surfaces 70 and 72 so that tabs 54 and 56 engage the openings 64 and 66, respectively. In this position, the tabs 54 and 56 would also be contiguous to the surfaces 70 and 72, respectively. As the battery door 12 is moved to the closed position (i.e. covering the battery opening 78), the tabs 52 and 54 engage a slot 74 while tabs 50 and 56 engage a slot 76. In the closed position, the battery door surfaces 80 and 82 are contiguous to the housing surfaces 84 and 86, respectively. The battery door 12 is then captured between the two sections of housing 2 and is constrained to slide in a direction 88 between a first position where it closes off the opening 78 and a second position (as shown) where the battery door 12 may be removed (FIG. 2). In both the first and second position, the battery door 12 prevents sections 8 and 10 from separating.

The battery door 12 includes a corrugated surface 58 to reduce slippage between a thumb or finger when sliding the battery door 12 and also has a locking slide switch 60, wherein protruding member 62 slideably engages a slot in the housing section 8 to secure the battery door 12 in the closed position. The two sections 8 and 10 of housing 2 are thus fastened without the use of additional fasteners. Locking slide switches are well known in the art and may be formed in any number of configurations. In the preferred embodiment, the locking slide switch 60 moves in the direction 36, which is perpendicular to the direction of the battery door sliding direction 88. Alternatively, the battery door could be self-attaining and self-locking. This would prevent the battery or battery door from accidentally dislodging, though its primary function would be to fasten the various sections of the pager's houding.

I claim:

1. A selective call receiver, comprising:
   a receiver circuit;
   energy means for powering the receiver circuit;
   first and second housing portions for housing the engery means and the receiver circuit; and
   a third housing portion engaging and securing the first and second housing portions, said third housing portion arranged to allow access to said energy means for replacement thereof.

2. A housing for an electronic device powered by a battery, comprising:
   first and second interlocking portions; and
   a battery cover, coupled to at least one of said first and second interlocking portions, for selectively providing access to said battery and for securing said first and second interlocking portions.

3. The housing according to claim 2 further comprising locking means coupled to at least one of said first and second interlocking portions for securing said battery cover.

4. A housing for an electronic device powered by a battery, comprising:
   first and second aligning portions; and
   a battery cover, coupled to at least one of said first and second aligning portions, for selectively providing access to said battery and for securing said first and second aligning portions.

5. The housing according to claim 4 further comprising aligning means coupled to at least one of said first and second aligning portions for securing said battery cover.

6. A housing for an electronic device powered by a battery, comprising:
   first and second interlocking portions; and
   a battery cover coupled to at least one of said first and second interlocking portions and capable of assuming an open and a closed position for providing access to said battery in said open position and for securing said first and second interlocking portions in at least said closed position.

7. The housing according to claim 6 further comprising locking means coupled to at least one of said first and second interlocking portions for securing said battery cover in at least said open position.

* * * * *